United States Patent
Lamaj et al.

(10) Patent No.: US 11,767,906 B2
(45) Date of Patent: *Sep. 26, 2023

(54) TRANSMISSION AND METHOD FOR PRODUCING A TRANSMISSION HAVING A HOUSING

(71) Applicant: SEW-EURODRIVE GMBH & CO. KG, Bruchsal (DE)

(72) Inventors: Ermalt Lamaj, Mannheim (DE); Mathias Müller, Rastatt (DE); Peter Eller, Graben-Neudorf (DE); Tobias Schwan, Wiesloch (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,980

(22) Filed: Mar. 7, 2022

(65) Prior Publication Data

US 2022/0186824 A1     Jun. 16, 2022

Related U.S. Application Data

(63) Continuation of application No. 16/628,826, filed as application No. PCT/EP2018/025161 on Jun. 13, 2018, now Pat. No. 11,268,609.

(30) Foreign Application Priority Data

Jul. 6, 2017  (DE) .................... 10 2017 006 409.1

(51) Int. Cl.
*F16H 57/021* (2012.01)
*B21D 53/88* (2006.01)
*F16H 57/02* (2012.01)

(52) U.S. Cl.
CPC .......... *F16H 57/021* (2013.01); *B21D 53/88* (2013.01); *F16H 2057/02008* (2013.01); *F16H 2057/02017* (2013.01)

(58) Field of Classification Search
CPC ......... F16H 57/021; F16H 2057/02008; F16H 2057/02017; B21D 53/88
See application file for complete search history.

(56) References Cited

U.S. PATENT DOCUMENTS

| | | | |
|---|---|---|---|
| 3,710,646 A | 1/1973 | Bogan | |
| 3,727,483 A | 4/1973 | Hanson | |

(Continued)

FOREIGN PATENT DOCUMENTS

| | | |
|---|---|---|
| CN | 202251847 U | 5/2012 |
| DE | 19754359 A1 | 6/1999 |

(Continued)

OTHER PUBLICATIONS

Machine Translation of ES 2602793 T3, obtained Jan. 11, 2023 from FIT database. (Year: 2017).*

(Continued)

*Primary Examiner* — Thomas C Diaz
(74) *Attorney, Agent, or Firm* — CARTER, DELUCA & FARRELL LLP (57) ABSTRACT

A transmission includes a housing, having lower and upper housing parts and bearing seats. A web is formed on the lower housing part between two bearing seats, which is pressed against a web provided on the upper housing part and between the bearing seats. When the housing parts are separated or pulled apart, a first web of one of the housing parts projects beyond a planar surface, which restricts the other webs thereof, or the webs of one of the housing parts are restricted by a planar separating surface, and except for a first web, the webs of the other housing part are also (Continued)

restricted by the planar separating surface and the first web projects beyond the separating surface when the housing parts are separated from each other. To form the housing, at least one of the housing parts is elastically deformed and/or preloaded.

20 Claims, 7 Drawing Sheets

(56) References Cited

U.S. PATENT DOCUMENTS

| | | | |
|---|---|---|---|
| 8,459,402 B2 | 6/2013 | Hamakita et al. | |
| 11,268,609 B2 * | 3/2022 | Lamaj | B21D 53/88 |
| 2010/0215306 A1 | 8/2010 | Georgi | |

FOREIGN PATENT DOCUMENTS

| | | | | |
|---|---|---|---|---|
| DE | 10 2008 004 337 A1 | 10/2008 | | |
| DE | 102007058904 A1 | 6/2009 | | |
| DE | 102008052547 A1 | 4/2010 | | |
| EP | 2147233 B1 | 9/2011 | | |
| ES | 2602793 T3 * | 2/2017 | ............. | F03D 15/00 |
| GB | 407432 A | 3/1934 | | |
| JP | 2012101649 A | 5/2012 | | |
| WO | 2012123045 A1 | 9/2012 | | |

OTHER PUBLICATIONS

Wittelh., Muhs D. Jannasch D., Voßiek J.: Roloff/Matek Maschinenelemente (Machine Elements) 19th edition, Wiesbaden: Vieweg Teubner, 2009, pp. Title, Editorial Details, 660, 664, ISBN 978 3 8348 0689 5 (Cited in Specification).

Köhler, Rögnitz: Maschinenteile (Machine Components), Part 2, 7th edition, Stuttgart: B. G. Teubner 1986, pp. Title, Editorial Details, 114, 115—ISBN 978 3 322 91833 8 (Cited in Specification).

International Search Report dated Oct. 4, 2018, in International Application No. PCT/EP2018/025161 (English-language translation).

International Preliminary Report on Patentability issued from the International Bureau dated Jan. 16, 2020.

* cited by examiner

TRANSMISSION AND METHOD FOR PRODUCING A TRANSMISSION HAVING A HOUSING

CROSS-REFERENCE TO RELATED APPLICATIONS

The present application is a continuation of U.S. patent application Ser. No. 16/628,826, which is the national stage of PCT/EP2018/025161, having an international filing date of Jun. 13, 2018, and claims priority to Application No. 102017006409.1, filed in the Federal Republic of Germany on Jul. 6, 2017, each of which is expressly incorporated herein in its entirety by reference thereto.

FIELD OF THE INVENTION

The present invention relates to a transmission and to a method for producing a transmission having a housing.

BACKGROUND INFORMATION

German Published Patent Document No. 10 2008 004 337 describes a transmission housing that has a lower housing part and an upper housing part placed on top.

A transmission is described in Chinese Published Patent Document No. 202251847 U.

German Published Patent Document No. 197 54 359 describes a transmission for a twin-screw extruder.

The publication WITTELH., MUHS D., JANNASCH D., VOßIEK J.: Roloff/Matek Maschinenelemente (Machine Elements) 19th edition, Wiesbaden: Vieweg Teubner, 2009, Pages: Title, Editorial Details, 660, 664, ISBN 978-3-8348-0689-5, describes a tight connection of housing parts.

The publication KÖHLER, RÖGNITZ: Maschinenteile (Machine Components), Part 2, 7th edition, Stuttgart: B. G. Teubner 1986, Pages: Title, Editorial Details, 114, 115—ISBN 978-3-322-91833-8, describes the attachment of shafts in a housing.

SUMMARY

Example embodiments of the present invention provide a transmission having a divided housing in an uncomplicated manner while ensuring the tightness of the housing in the process.

According to example embodiments of the present invention, a transmission includes a housing, which has a lower housing part and an upper housing part, the housing in particular being made up of the lower and the upper housing parts. The housing has bearing seats, and a web is formed on the lower housing part between two bearing seats in each case, which is pressed against a web that is provided on the upper housing part and situated between the respective bearing seats. The housing parts have an elastic distortion or deformation such that when the two housing parts are separated and/or pulled apart, that is to say, in an elastic stress relaxation, in particular, a first web of the webs of a first of the two housing parts projects beyond a planar surface, in particular a separating surface, which restricts the other webs of the first housing part, or the webs of one of the housing parts are restricted by a planar separating surface, and with the exception of a first web, the webs of the respective other housing part are also restricted by the planar separating surface, and the first web projects beyond the separating surface when the housing parts are separated from each other, so that in order to form the housing of interconnected housing parts, at least one of the housing parts is elastically deformed and/or preloaded.

This has the advantage that a planar separating surface is provided on the lower housing part. The production is simple as a result because flat machining, in particular flat cutting and/or flat grinding, may be carried out. In the same manner, a simple production is achievable on the upper housing part because a planar separating surface is able to be implemented there as well. However, a region for providing the first web is left off there. This region, which projects on the upper housing part toward the lower housing part, i.e., through the separating surface, is used for providing the first web. The projection of the first web beyond the separating surface is so small that only an elastic but no inelastic deformation occurs when the two housing parts are connected. After the two housing parts have been connected, it is thus possible to introduce the bearing bores into the housing. Therefore, a release of the connection and a subsequent renewed connection of the housing parts in order to construct the housing ultimately does not change the geometry. The bearing bores are deformed only in the separated state. The bore axes of the bearing bores are situated in the imaginary plane of the planar separating surfaces. With the aid of the elastic deformation, a particularly high tightness is able to be provided without the first web being pressed against the corresponding web by screws that are situated inside it.

The bearing bores, i.e., bearing seats, penetrate the wall of the housing parts and are arranged in two parts in each case, i.e., only on the front side and the rear side of the respective housing part. The webs form the end regions of the wall of the housing parts and have a bipartite configuration in each case, i.e., on the front side and the rear side of the respective housing part.

According to example embodiments, the first web is situated between the bearing seat for the bearing of the input shaft and the bearing seat for a bearing of a first intermediate shaft. This offers the advantage that a small axle spacing is achievable in the input gear stage notwithstanding the fact that the housing has a divided configuration. The reason for this is that the first web does not have to accommodate a pin or a screw and may thus have a narrow configuration.

According to example embodiments, with the exception of the first web and the web of the other housing part contacting this first web, all webs have a recess to accommodate a pin and at least one screw. This offers the advantage that the housing parts are connectable to each other and the webs that correspond to each other are pressed against each other in the process. The first web, too, is pressed against the respectively allocated web of the other housing part.

According to example embodiments, bearing seats are arranged as bearing bores in each case, and the bores, in particular the bore axes, are aligned parallel to one another, the bore axes of the bearing bores being situated in a plane. This is considered advantageous insofar as a planar separating surface is able to be provided.

According to example embodiments, no recess for accommodating a pin and/or a screw or a plurality of screws is introduced into the first web of the first housing part. This has the advantage that the first web may have a very narrow configuration, with the result that the axis clearance of the input stage may be very small despite large bearings, and thus the possibility of transmitting high torques.

According to example embodiments, a recess for accommodating a pin and at least one recess for accommodating a screw are introduced into the other webs in each case, the recesses in particular being arranged as bores whose bore axes are aligned in the normal direction to the planar surface. This has the advantage that a high contact pressure is achievable between the two housing parts.

According to example embodiments, the first web has a narrower configuration than the other webs of the first housing part. This has the advantage that the axis clearance of the input stage may be very small despite large bearings, and thus the possibility of transmitting high torques.

According to an example embodiment of the present invention, a method for producing a transmission includes a first method step, in which, with the exception of a region provided for a first web, a planar separating surface is machined, in particular milled out, on a first unfinished casting part in order to produce an upper housing part of the housing of the transmission, the region projecting through the plane that accommodates the planar separating surface, a planar separating surface being machined, in particular milled out, on a second unfinished casting part in order to produce a lower housing part of the housing of the transmission. In a subsequent, second method step, recesses for accommodating a respective pin or a respective screw are introduced outside the region, in particular drilled, into the first and/or second unfinished casting part, i.e., in particular the lower and/or upper housing part. In a subsequent, third method step, the first and the second unfinished casting parts are connected, in particular with the aid of the pins and the screws. In a following, fourth method step, the bearing bores are introduced for producing the housing made up of the lower and upper housing parts, the first web in particular being produced as well. In a subsequent, fifth method step, the lower housing part is separated from the upper housing part, in particular by removing the screws. In a subsequent, sixth method step, bearings, shafts and toothed wheels are placed in the lower housing part, in particular after the upper and the lower housing parts have been cleaned. In a subsequent, in particular final, seventh method step, the upper housing part is placed on top of the lower housing part and connected.

This has the advantage that the bores are introduced when the two housing parts are substantially deformed in the same manner as in the finished transmission. This is so because a high contact pressure is exerted on the first web during the connection process, and the housing part is deformed as a result in the course of the connection process. This deformation remains unchanged even after the connection of the two housing parts has been released and subsequently reestablished. Thus, the bearing bores, e.g., having a circular-cylindrical configuration, are not deformed, and in particular are circular when the housing parts are connected repeatedly.

Further features and aspects of example embodiments of the present invention are described in greater detail below with reference to the appended Figures.

DETAILED DESCRIPTION

Figure 1:
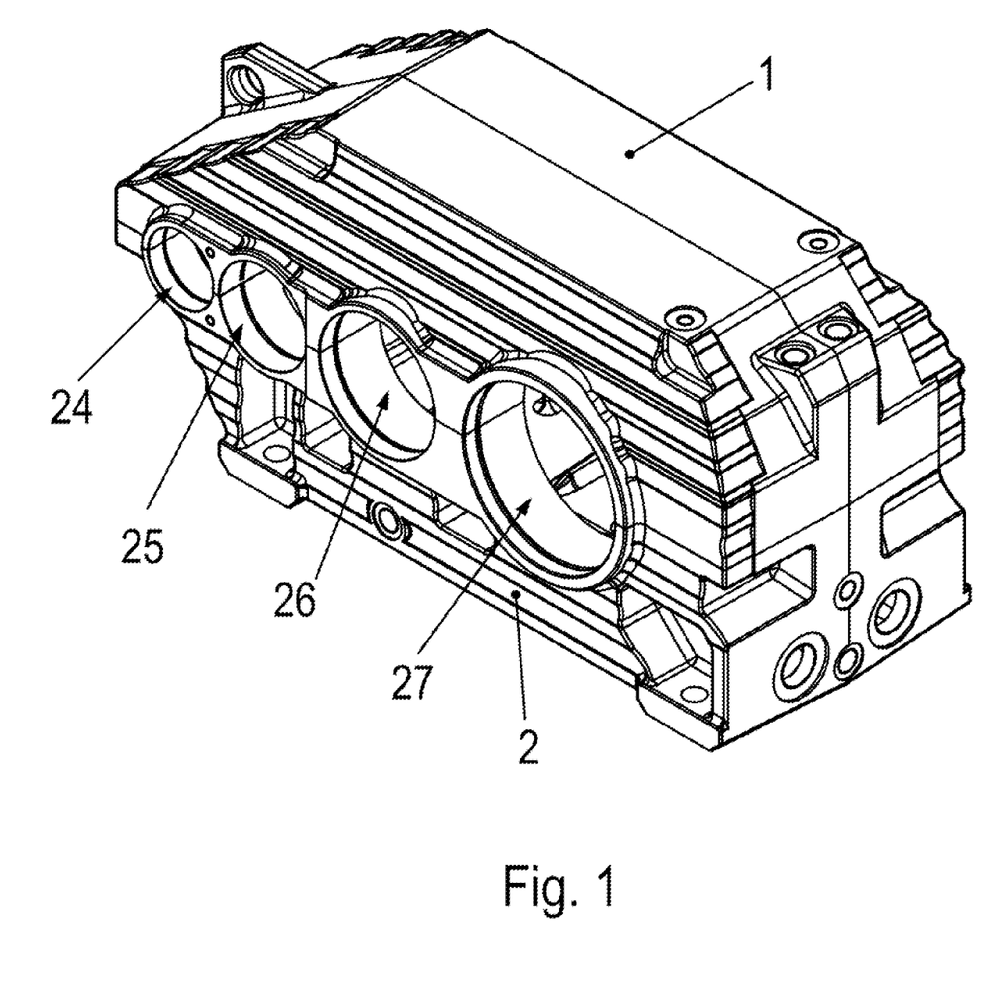
FIG. 1 is a schematic perspective view of a housing of a transmission according to an example embodiment of the present invention.
Figure 2:
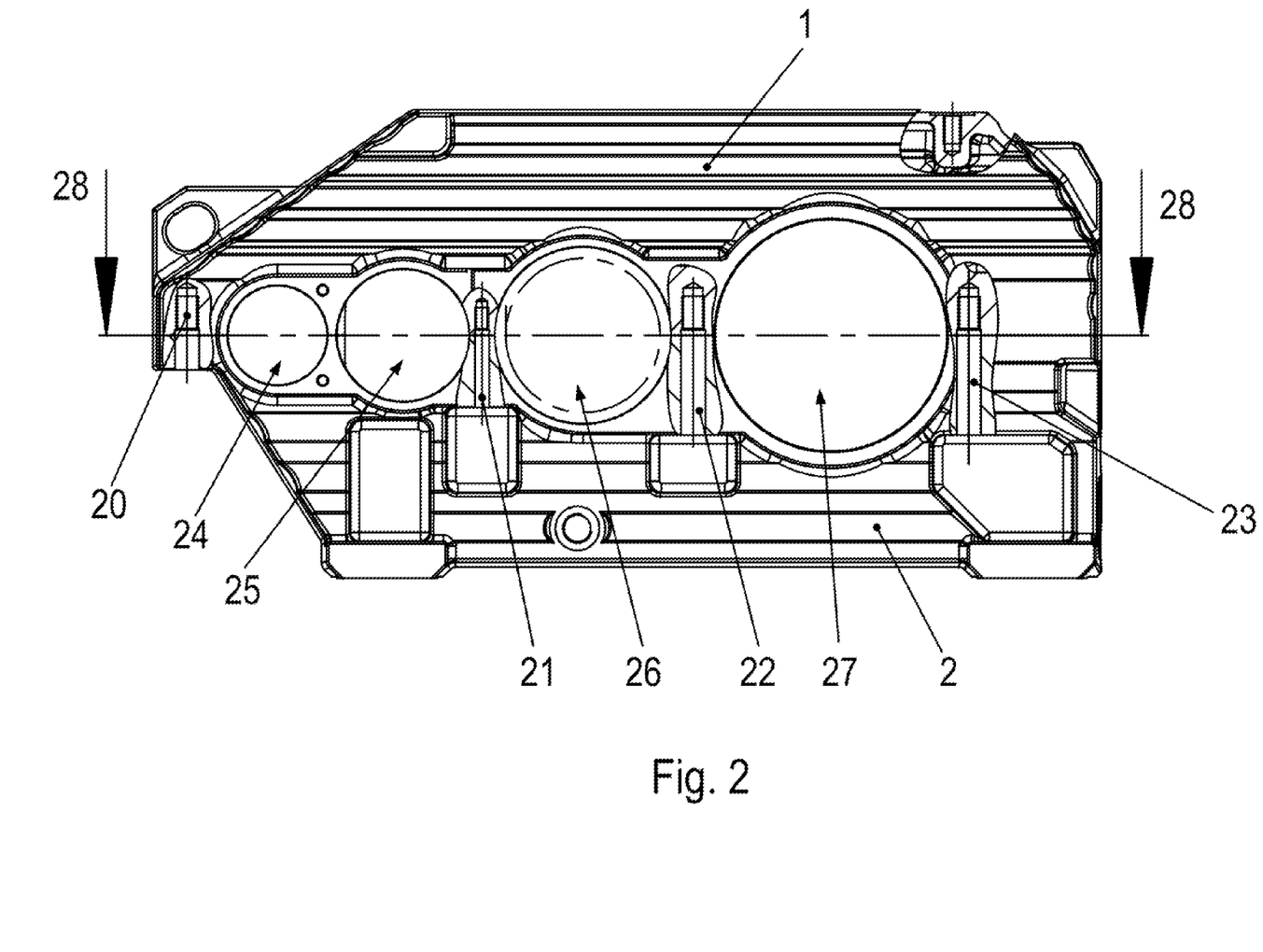
FIG. 2 is a schematic side view of the housing, the receiving region (20, 21, 22, 23) for screws (70) being shown in a part-sectional view.
Figure 3:
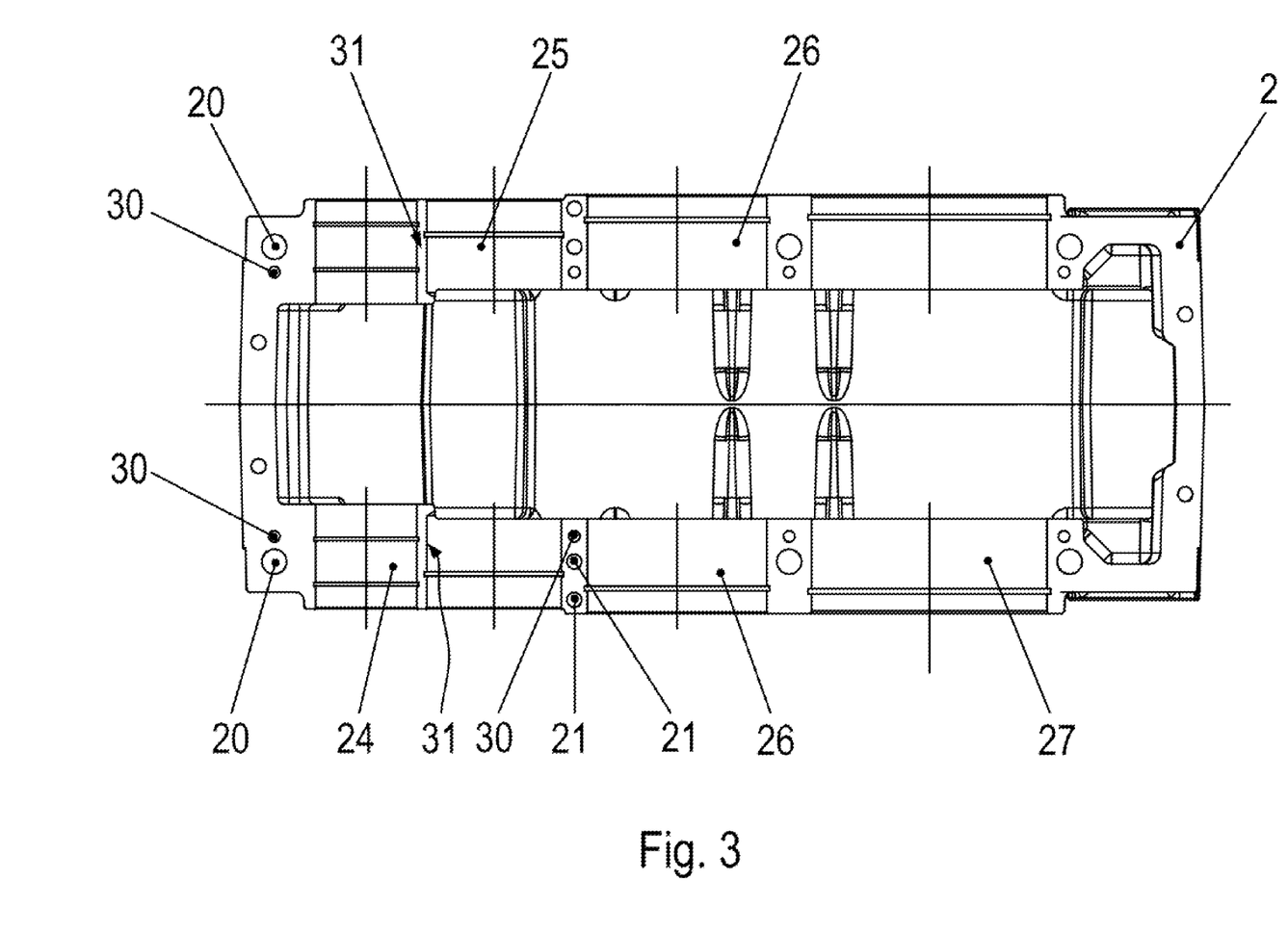
FIG. 3 is a schematic plan view of lower housing part 2.
Figure 4:
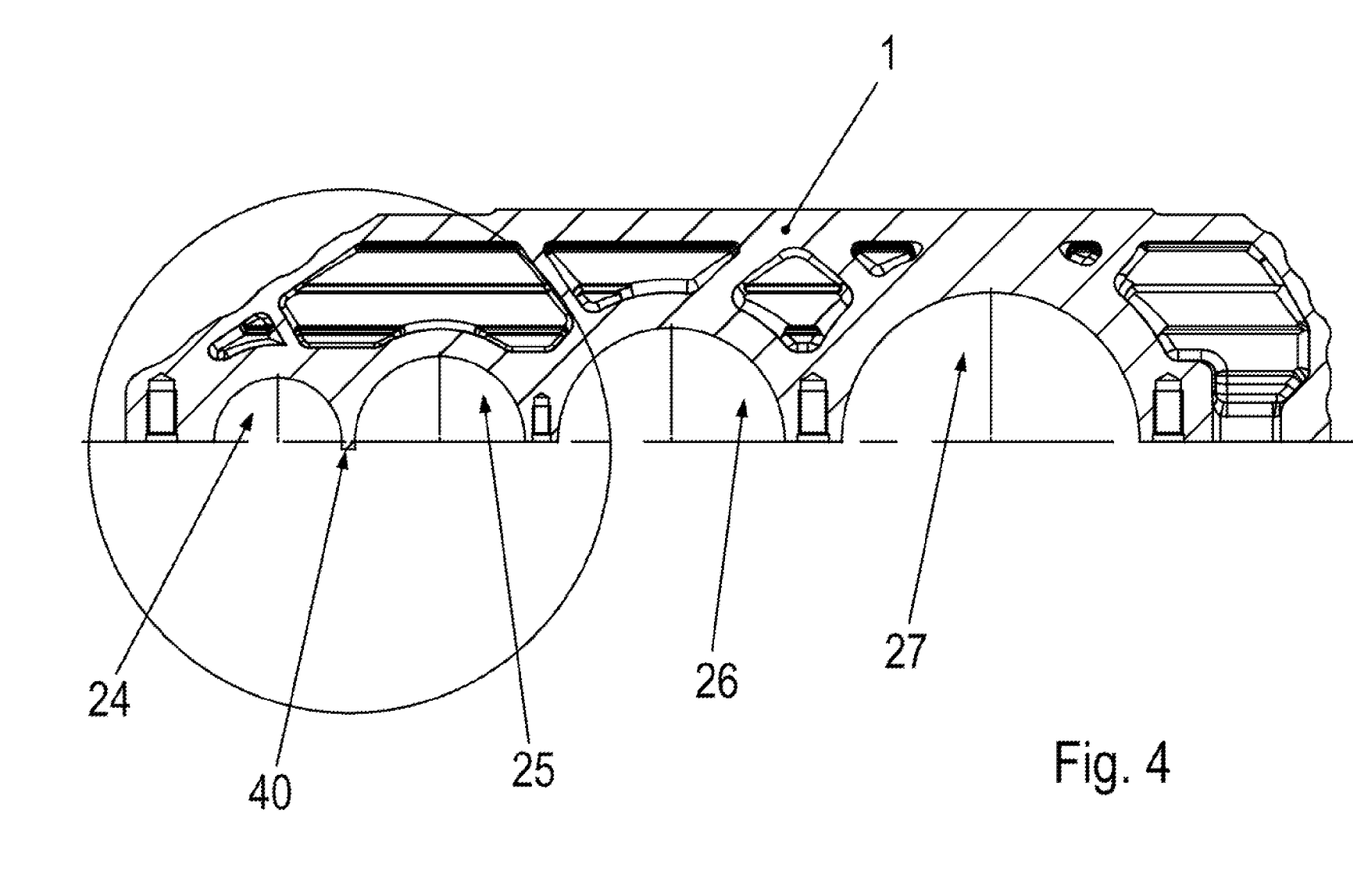
FIG. 4 is a schematic side view of upper housing part 1.
Figure 5:
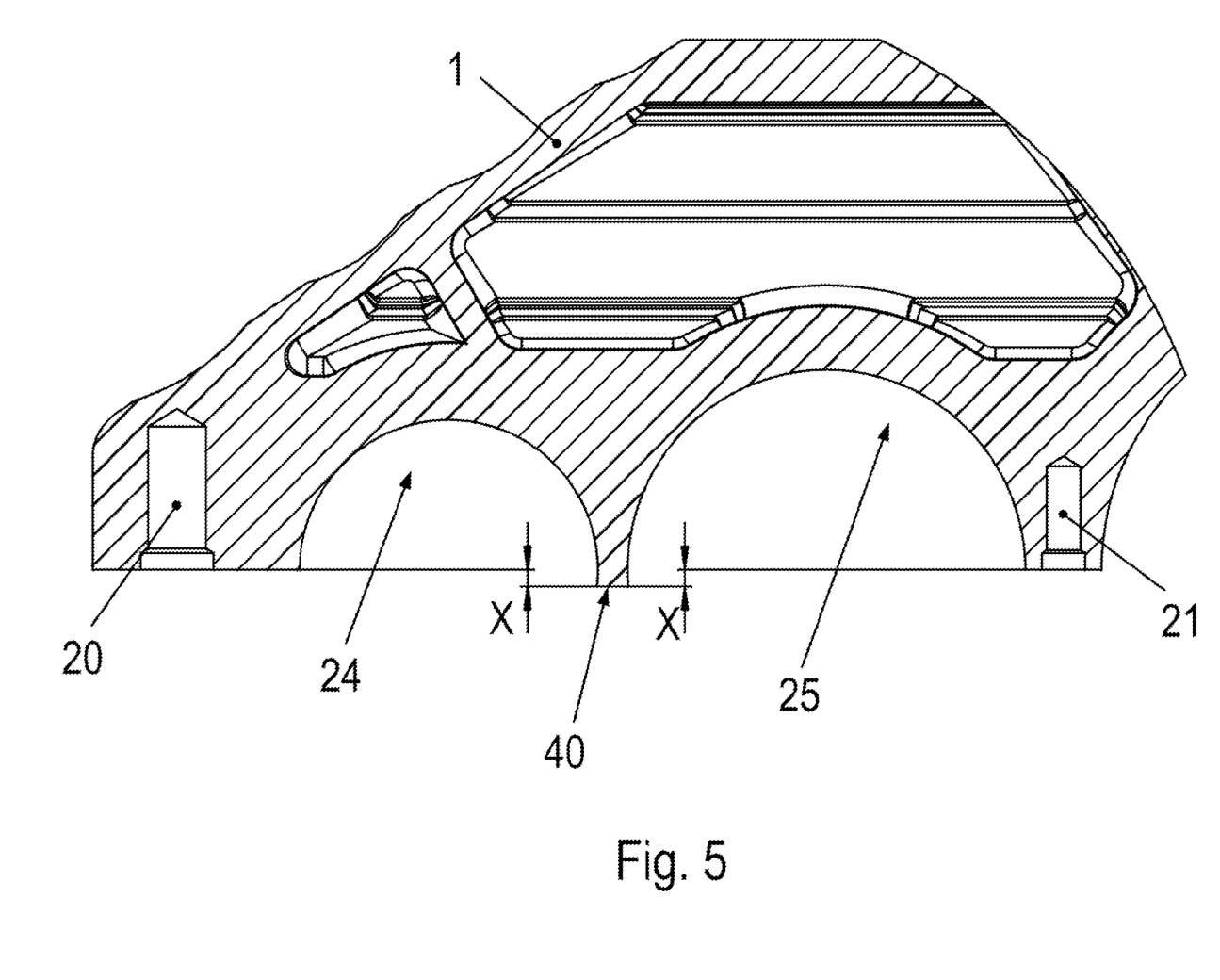
FIG. 5 is an enlarged schematic cross-sectional view of FIG. 4.
Figure 6:
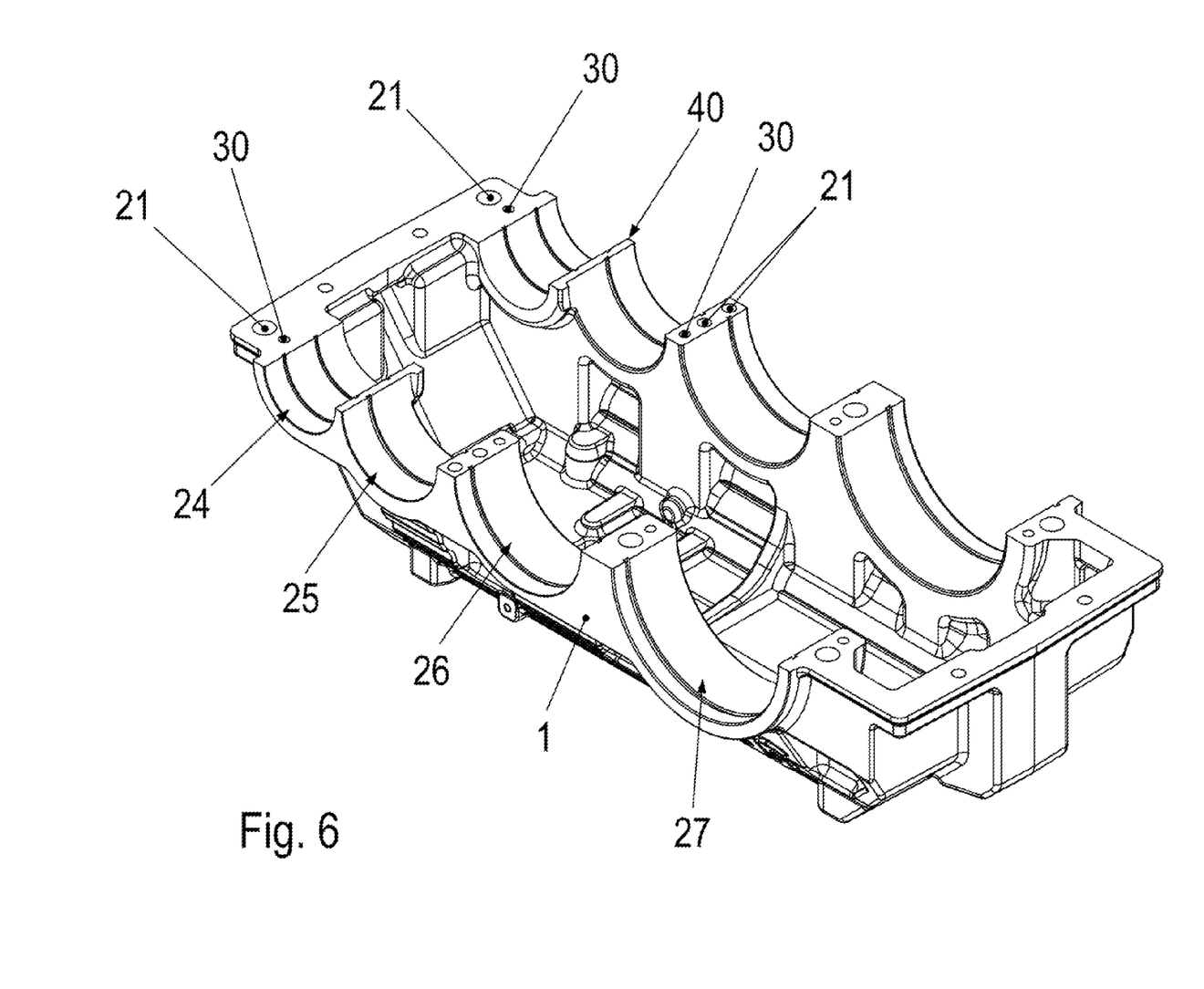
FIG. 6 is a schematic perspective view of upper housing part 1.
Figure 7:
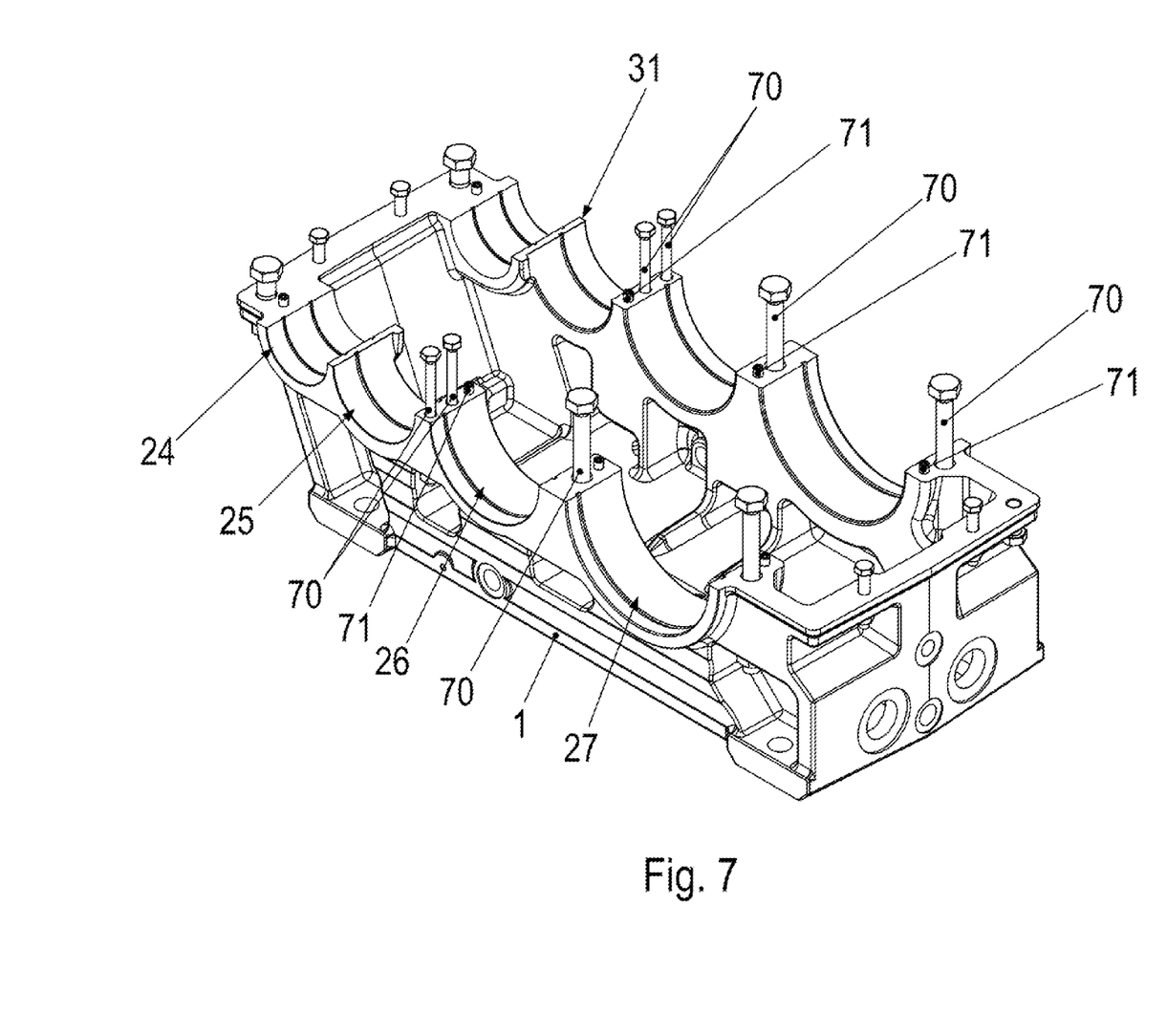
FIG. 7 is a schematic perspective view of lower housing part 2.

As schematically illustrated in the Figures, the transmission has a housing, which includes a lower housing part 2 and an upper housing part 1 that is placed on top of this lower housing part 2.

A planar separating surface (28) is provided between the two housing parts (1, 2).

Toward this end, all webs and housing walls of lower housing part 2 are milled and machined to be planar along this separating surface (28).

Although upper housing part 1 is also processed to have a planar separating surface (28), a web 40 projects beyond this separating surface (28) and has a projection X. This web 40 is situated between two bearing seats (24, 25) but no screw is situated between the two bearing seats (24, 25).

Cylindrical bores are introduced into the housing as bearing seats 24, 25 and 26, whose bore axes are situated in a common plane that encompasses the separating surface (28).

Within the common plane, in a direction perpendicular to the bore axes, the bearing seats are set apart from one another in each case. The associated clearance regions have webs of the upper and lower housing parts (1, 2) that taper toward the separating surface (28). With the exception of a particularly narrow web (40) provided on upper housing part 1 and a particularly narrow web 31 provided on lower housing part 2, all other webs include bores through which screws are guided in order to press the two housing parts (1, 2) against each other. As a result, a web of upper housing part 1 including such a bore is pressed against a web of lower housing part 2 also including a bore in each case, and a tight connection along separating surface (28) is established. In addition, a bonding agent and/or a sealing arrangement may be provided between the webs.

Before the upper housing part is pressed against the lower housing part (1, 2), web 40 of upper housing part 1 projects, in particular by a projection X, closer toward lower housing part 1. During the joining operation, web 40 is pressed onto web 31 and at least upper housing part 1 is therefore deformed when the screws are tightened. A contact pressure of the webs (31, 40) that ensures tightness is therefore achieved in this manner. In addition, a bonding agent and/or a sealing arrangement may be provided between the webs (31, 40) as well.

To produce bearing bores that are highly accurate, the following approach is used because of the mentioned deformation:

In a first method step, the separating surface (28) of upper housing part 1 and lower housing part 2 is machined, in particular milled, in the unfinished parts of the first and second housing parts (1, 2). In the process, web 40 is machined such that it protrudes from the separating surface (28).

With the exception of web 40, a pin 30 is introduced into all webs situated between bearing seats in a recess that is introduced into the respective web of lower housing part 2.

In addition, screws are introduced into the respective web in order to screw lower housing part 2 to upper housing part 1. As a result, each web, with the exception of web 40, thus accommodates a pin and two screws in each case. In this manner, precise relative positioning is achievable with the aid of the pin and sufficient contact pressure is able to be induced with the aid of the screws when upper housing part 1 and lower housing part 2 are subsequently connected, i.e. during the second method step.

In a third method step, the bearing seats are drilled after upper housing part 1 and lower housing part 2 have been connected. The bore axis is encompassed by the planar separating surface (28).

The distortions created by web 40 during the connecting operation thus do not distort the bearing seats because they are introduced in the connected state of the housing part.

After the introduction of the bearing seats, i.e. bearing bores, the screwed connection between lower housing part 2 and upper housing part 1 is released.

The two housing parts 1 and 2 are subsequently cleaned, whereupon the bearings, shafts of the transmission and the toothed wheels connected to the shaft in a torsion-proof manner are introduced into at least one of housing parts 1 or 2.

As a final method step, upper housing part 1 is then placed back on lower housing part 2 and connected with the aid of the pins and screws, in particular pressed against each other. This completes the production of the transmission.

While the above-described production method may have the disadvantage that housing parts 1 and 2 are first connected and then separated again only to be ultimately reconnected again, it offers the advantage that the distortions and the related deformations that are induced during the joining process by pressing web 40, which projects beyond the planar separating surface (28), onto web 31 do not cause any deformation of the cylindrical bearing seat, i.e., the bearing seat bore. This is so because the bearing bores are introduced into connected, i.e., deformed, housing parts 1 and 2.

Separating the housing into an upper housing part 1 and a lower housing part 2 is considered advantageous for the assembly of the shafts and bearings because they simply have to be inserted from the normal direction of the separating surface (28) and do not need not be threaded through narrow openings.

In the illustrated exemplary embodiment, the bearing of the input shaft is accommodated in bearing seat 24, the bearings of the intermediate shafts are accommodated in bearing seats 25 and 26, and the bearing of the output shaft is accommodated in bearing seat 27.

The bearing bores, i.e., bearing seats (24, 25, 26, 27), penetrate the wall of the housing parts (1, 2) and are arranged as two parts in each case, i.e., on the front side and the rear side of the respective housing part (1, 2). The webs (31, 40) form the end regions of the wall of the housing parts (1, 2) and each web includes two parts, i.e., on the front side and the rear side of the respective housing part (1, 2).

LIST OF REFERENCE CHARACTERS

1 upper housing part
2 lower housing part
20 screw
21 screw
22 screw
23 screw
24 bearing seat
25 bearing seat
26 bearing seat
27 bearing seat
28 planar separating surface
30 pin
31 web
40 projecting web
70 screw
71 pin
X projection

What is claimed is:

1. A transmission, comprising:
a housing including a first housing part and a second housing part;
wherein the first housing part includes a planar surface, a plurality of first bearing seat portions arranged along the planar surface, and first webs arranged between each adjacent pair of first bearing seat portions;
wherein the second housing part including a mating surface to the planar surface, a plurality of second bearing seat portions arranged along the mating surface, and second webs arranged between each adjacent pair of second bearing seat portions, the mating surface having a first portion located along a plane and a second portion, corresponding to at least one of the second webs, extending beyond the plane of the first portion in an unassembled state of the housing, the second portion being elastically deformable, so that in an assembled state of the housing, the second portion is elastically deformed to align with the plane, the first housing part and the second housing part being joined at the planar surface of the first housing part and the mating surface of the second housing part along the plane.

2. The transmission according to claim 1, wherein the first bearing seat portions and the second bearing seat portions form bearing seats in the assembled state of the housing.

3. The transmission according to claim 1, wherein the second portion corresponds to a single one of the second webs.

4. The transmission according to claim 1, wherein the housing consists of the first housing part and the second housing part.

5. The transmission according to claim 1, wherein the at least one of the second webs is arranged between a bearing seat for a bearing of an input shaft and a bearing seat for a bearing of an intermediate shaft.

6. The transmission according to claim 1, wherein, with the exception of the at least one of the second webs and a first web contacting the at least one of the second webs, all first webs and second webs include a recess adapted to accommodate a pin.

7. The transmission according to claim 2, wherein the bearing seats are arranged as bearing bores.

8. The transmission according to claim 7, wherein bore axes of the bearing bores are aligned parallel to each other.

9. The transmission according to claim 7, wherein bore axes of the bearing bores are arranged in a plane.

10. The transmission according to claim 1, wherein no recess for accommodating a pin and/or a screw or a plurality of screws is provided in the at least one of the second webs.

11. The transmission according to claim 1, wherein all of the first webs and the second webs, except the at least one of the second webs and a corresponding at least one of the first webs of the first housing part contacting the at least one of the second webs, include a recess adapted to accommodate a pin and at least one recess adapted to accommodate a screw.

12. The transmission according to claim 1, wherein the recesses are arranged as bores having bore axes aligned in a normal direction to the planar surface.

13. The transmission according to claim 1, wherein the at least one of the second webs is narrower than all other second webs.

14. The transmission according to claim 1, wherein a first one of the first housing part and the second housing part is arranged as an upper housing part and a second one of the first housing part and the second housing part is arranged as a lower housing part.

15. The transmission according to claim 1, wherein a bonding agent and/or sealant is arranged between the first housing part and the second housing part along the planar surface and the mating surface in the assembled state of the housing.

16. The transmission according to claim 1, wherein a bonding agent and/or sealant is arranged between the first webs and the second webs along the planar surface and the mating surface in the assembled state of the housing.

17. The transmission according to claim 2, further comprising a bearing arranged in each bearing seat.

18. The transmission according to claim 2, wherein at least one bearing seat is machined in the housing in the assembled state of the housing.

19. The transmission according to claim 1, wherein the first housing part and the second housing part are screw-connected to each other in the assembled state of the housing.

20. The transmission according to claim 1, further comprising at least one shaft and at least one toothed wheel arranged in an interior of the housing.

* * * * *